US010300513B2

(12) United States Patent
Tatebayashi et al.

(10) Patent No.: US 10,300,513 B2
(45) Date of Patent: May 28, 2019

(54) PIERCING PLUG AND MANUFACTURING METHOD OF PIERCING PLUG

(71) Applicant: Nippon Steel & Sumitomo Metal Corporation, Tokyo (JP)

(72) Inventors: Yosuke Tatebayashi, Tokyo (JP); Yasuyoshi Hidaka, Tokyo (JP); Yasuto Higashida, Tokyo (JP); Kouji Nakaike, Tokyo (JP); Takateru Inage, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 375 days.

(21) Appl. No.: 14/422,692

(22) PCT Filed: Aug. 1, 2013

(86) PCT No.: PCT/JP2013/070931
§ 371 (c)(1),
(2) Date: Sep. 30, 2015

(87) PCT Pub. No.: WO2014/034376
PCT Pub. Date: Mar. 6, 2014

(65) Prior Publication Data
US 2016/0053358 A1    Feb. 25, 2016

(30) Foreign Application Priority Data

Aug. 28, 2012 (JP) ................. 2012-187913

(51) Int. Cl.
*B21B 25/00* (2006.01)
*C23C 4/10* (2016.01)
*C23C 4/06* (2016.01)
*C23C 4/12* (2016.01)
*B23K 9/04* (2006.01)
(Continued)

(52) U.S. Cl.
CPC .............. *B21B 25/00* (2013.01); *B23K 9/042* (2013.01); *B23K 9/044* (2013.01); *B23K 9/23* (2013.01);
(Continued)

(58) Field of Classification Search
CPC ...................................... B21B 25/00
See application file for complete search history.

(56) References Cited

U.S. PATENT DOCUMENTS 2,197,098 A * 4/1940 Davis ............... B21B 25/00
148/332
4,393,677 A * 7/1983 Tamura ............ B21B 19/04
72/209
(Continued)

FOREIGN PATENT DOCUMENTS

EP    2404680       1/2012
JP    59-013924    4/1984
(Continued)

OTHER PUBLICATIONS

Machine translation of RU 2357066 C2, Shvetsov et al., translated on May 10, 2017, pp. 1-5.*
(Continued)

*Primary Examiner* — Teresa M Ekiert
(74) *Attorney, Agent, or Firm* — Birch, Stewart, Kolasch & Birch, LLP

(57) ABSTRACT

A piercing plug includes a plug main body, and a sprayed coating which is formed on a surface of the plug main body and includes iron and iron oxide. A chemical composition of the sprayed coating includes, in addition to the iron and the iron oxide, by mass %, C: 0.015% to 0.6%, Si: 0.05% to 0.5%, Mn: 0.1% to 1.0%, and Cu: 0 to 0.3%.

5 Claims, 2 Drawing Sheets

(51) Int. Cl.
  *B23K 9/23*     (2006.01)
  *C22C 38/00*    (2006.01)
  *C22C 38/02*    (2006.01)
  *C22C 38/04*    (2006.01)
  *C22C 38/16*    (2006.01)
  *C23C 4/08*     (2016.01)
  *C23C 4/131*    (2016.01)
  *B23K 35/30*    (2006.01)
  *B23K 103/04*   (2006.01)
  *B23K 101/20*   (2006.01)

(52) U.S. Cl.
  CPC ........ *B23K 35/3073* (2013.01); *C22C 38/002* (2013.01); *C22C 38/02* (2013.01); *C22C 38/04* (2013.01); *C22C 38/16* (2013.01); *C23C 4/06* (2013.01); *C23C 4/08* (2013.01); *C23C 4/10* (2013.01); *C23C 4/12* (2013.01); *C23C 4/131* (2016.01); *B23K 2101/20* (2018.08); *B23K 2103/04* (2018.08)

(56) References Cited

U.S. PATENT DOCUMENTS

| | | | | |
|---|---|---|---|---|
| 5,643,531 | A * | 7/1997 | Kim | C22C 38/32 148/326 |
| 7,383,710 | B2 * | 6/2008 | Yamakawa | B21B 25/00 72/209 |
| 2005/0260429 | A1 * | 11/2005 | Singbeil | B32B 15/015 428/544 |

FOREIGN PATENT DOCUMENTS

| | | | |
|---|---|---|---|
| JP | 03204106 A * | 9/1991 | ............ B21B 25/00 |
| JP | 04-008498 | 2/1992 | |
| JP | 2508862 | 6/1996 | |
| JP | 10-180315 | 7/1998 | |
| JP | 2002047533 | 2/2002 | |
| JP | 4279350 | 6/2009 | |
| JP | 2010-227999 | 10/2010 | |
| RU | 2357066 C2 * | 5/2009 | |
| RU | 2446024 | 3/2012 | |
| SU | 818684 | 4/1981 | |

OTHER PUBLICATIONS

Machine translation of JP 03204106 A, Tsubouchi, pp. 1-3, translated on Oct. 3, 2017.*
International Search Report dated Aug. 27, 2013 issued in corresponding PCT Application No. PCT/JP2013/070931 [with English Translation].
Search Report dated May 23, 2016 issued in related European Application No. 13833049.3.
Office Action dated May 30, 2016 issued in related Russian Application No. 2015105820 [with English Translation].

* cited by examiner

PIERCING PLUG AND MANUFACTURING METHOD OF PIERCING PLUG

TECHNICAL FIELD

This application is a national stage application of International Application No. PCT/JP2013/070931, filed Aug. 1, 2013, which claims priority to Japanese Patent Application No. 2012-187913, filed on Aug. 28, 2012, each of which is incorporated by reference in its entirety.

The present invention relates to a plug, and more particularly, to a plug (hereinafter, referred to as a "piercing plug") used in a piercing machine which pierces and rolls a billet.

Priority is claimed on Japanese Patent Application No. 2012-187913, filed on Aug. 28, 2012, and the contents of which are incorporated herein by reference.

A piercing machine is used to manufacture a seamless steel pipe through the Mannesman process. The piercing machine includes a pair of inclined rolls and a piercing plug. The piercing plug is disposed on a pass line between the pair of inclined rolls. The piercing machine presses the plug into the billet while rotating the billet in the circumferential direction using the inclined rolls to pierce and roll the billet, thereby manufacturing a hollow tube stock.

The piercing machine pierces and rolls the billet heated at a high temperature. Therefore, the piercing plug pressed into the billet is exposed to the high temperature and receives a high pressure. Therefore, the piercing plug is likely to be subjected to erosion and seizure.

Generally, oxidized scale is formed on the surface of a base material of the piercing plug. The oxidized scale blocks heat from the billet and suppresses the generation of erosion. Furthermore, the oxidized scale suppresses the generation of seizure.

However, the oxidized scale wears when the billet is pierced and rolled. When the oxidized scale is removed, the temperature of the base material of the piercing plug is increased, and thus the piercing plug is eroded.

In order to improve a use frequency of the piercing plug, it is suggested that a sprayed coating is formed on the surface of the base material (plug main body) of the piercing plug (for example, refer to Patent Documents 1 and 2).

PRIOR ART DOCUMENT

Patent Document

[Patent Document 1] Japanese Examined Patent Application, Second Publication No. S59-13924
[Patent Document 2] Japanese Patent, Publication No. 4279350
[Patent Document 3] Japanese Examined Patent Application, Second Publication No. H04-8498
[Patent Document 4] Japanese Unexamined Patent Application, First Publication No. H10-180315

DISCLOSURE OF THE INVENTION

Problem that the Invention is to Solve

In piercing plugs disclosed in Patent Documents 1 and 2, the piercing-rolling of the billet is repeated, and thus, damage such as wrinkles or cracks occurs on the sprayed coating. However, in the piercing plugs disclosed in Patent Documents 1 and 2, if the sprayed coating is formed on the surface of the plug main body again, the piercing plug can be reused as the piercing plug for manufacturing the hollow tube stock having the same size. That is, the use frequency of the piercing plug is improved.

However, when the sprayed coating of the piercing plug is easily damaged, it is necessary to form the sprayed coating numerous times again. As a result, the piercing plug should be frequently removed from the piercing machine and a spraying operation should be performed, and thus, there is a concern that manufacturing efficiency of the hollow tube stock may be decreased.

The present invention is made in consideration of the above-described problems, and an object thereof is to provide a piercing plug capable of suppressing a decrease in manufacturing efficiency of the hollow tube stock and a manufacturing method thereof.

Means for Solving the Problems

In order to solve the problems described above and achieve the object of the present invention, the present invention adopts the following measures. That is, (1) According to an aspect to the present invention, there is provided a piercing plug including: a plug main body; and a sprayed coating which is formed on a surface of the plug main body and includes iron and iron oxide. A chemical composition of the sprayed coating includes, in addition to the iron and the iron oxide, by mass %, C: 0.015% to 0.6%, Si: 0.05% to 0.5%, Mn: 0.1% to 1.0%, and Cu: 0 to 0.3%.

(2) In the piercing plug described in (1), a content of C in the chemical composition of the sprayed coating may be 0.2% to 0.6%.

(3) In the piercing plug described in (1) or (2), a content of Cu in the chemical composition of the sprayed coating may be 0.05% to 0.3%.

(4) According to another aspect of the present invention, there is provided a manufacturing method of a piercing plug including a plug main body, and a sprayed coating which is formed on a surface of the plug main body, the manufacturing method including, a process of forming the sprayed coating on the surface of the plug main body by arc-spraying a steel wire rod on the surface of the plug main body. A chemical composition of the steel wire rod includes, by mass %, C: 0.05% to 1.1%, Si: 0.4% to 1.3%, Mn: 0.2% to 2.0%, Cu: 0 to 0.5%, and Fe.

(5) In the manufacturing method of a piercing plug described in (4), a content of C in the chemical composition of the steel wire rod may be 0.6% to 1.1%.

(6) In the manufacturing method of a piercing plug described in (4) or (5), a content of Cu in the chemical composition of the steel wire rod may be 0.05% to 0.5%.

Effect of the Invention

According to the aspects, since strength of the sprayed coating of the piercing plug is improved (that is, a service life of the sprayed coating is improved), it is not necessary to frequently remove the piercing plug from a piercing machine. As a result, manufacturing efficiency of a hollow tube stock can be suppressed from being decreased.

BEST MODE FOR CARRYING OUT THE INVENTION

Figure 1:
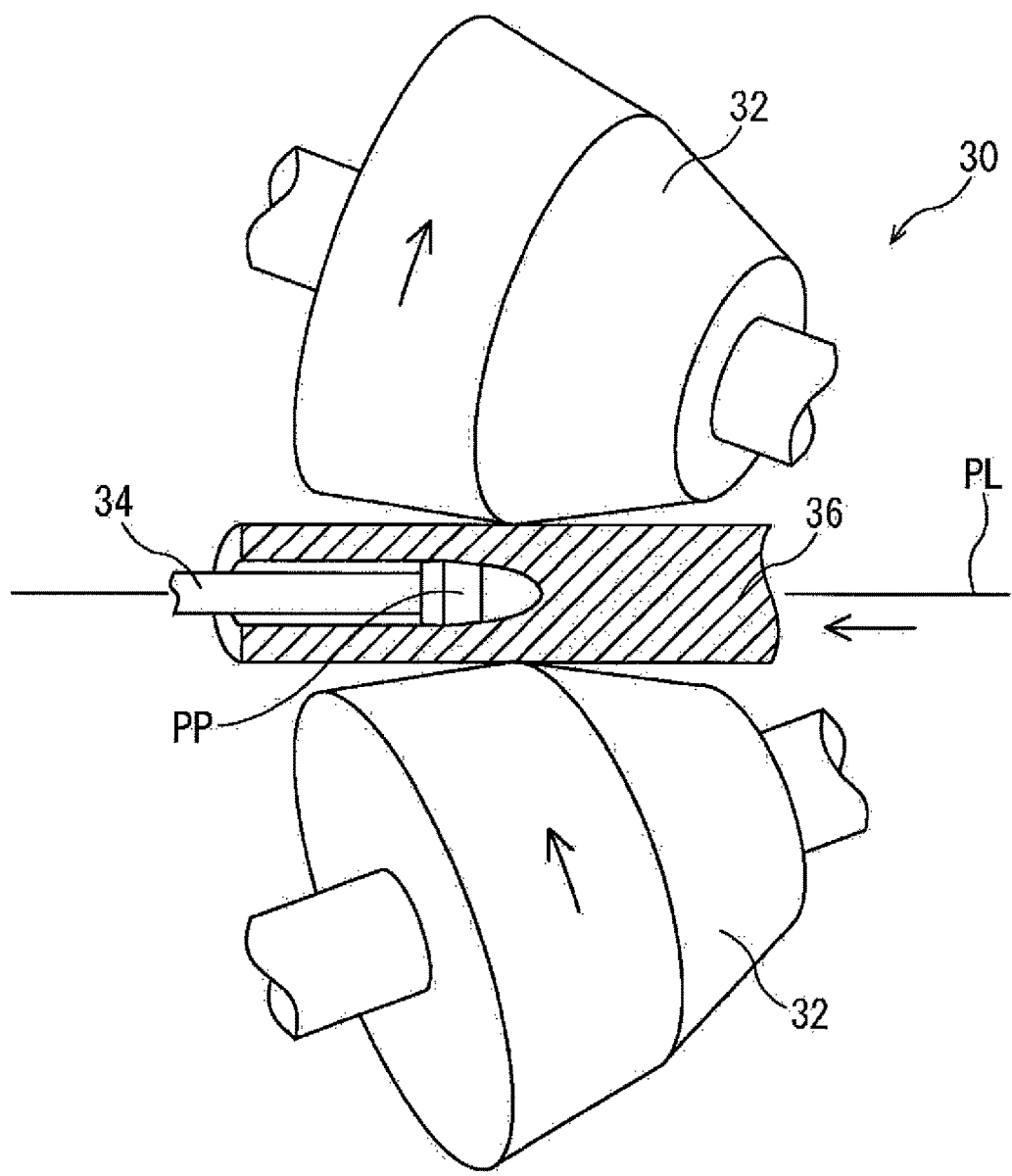
FIG. 1 is a schematic view showing a configuration of a general piercing machine.

Hereinafter, a piercing plug according to an embodiment of the present invention and a manufacturing method thereof will be described with reference to the drawings. The same reference numerals are attached to the same portions or the corresponding portions in the drawings, and the descriptions are not repeated.

FIG. 1 is a schematic view showing a configuration of a general piercing machine 30. In the piercing machine 30, a piercing plug PP is mounted on a tip of a core metal 34 and is disposed on a pass line PL between a pair of inclined rolls 32 and 32. When piercing-rolling is performed, the piercing plug PP is pressed into a billet 36. Therefore, the piercing plug PP is exposed to a high temperature and receives a high pressure.

As described above, in the related art, it is suggested that the sprayed coating is formed on the surface of the plug main body which is a base material of the piercing plug PP. When the sprayed coating of the piercing plug PP is easily damaged, in order to form the sprayed coating again, the piercing plug PP should be frequently removed from the piercing machine 30 and a spraying operation (a restoration operation of the sprayed coating) should be performed. In the piercing plug PP, by increasing strength of the sprayed coating (that is, extending a service life of the sprayed coating), it is not necessary to form new sprayed coatings numerous times again.

Accordingly, in the piercing plug according to the present embodiment, a sprayed coating including iron oxide is formed on a surface of a plug main body by arc-spraying a steel wire rod including at least, by mass %, C (carbon) of 0.05% to 1.1%, Si (silicon) of 0.4% to 1.3%, and Mn (manganese) of 0.2% to 2.0%, and remainder including Fe (iron) and impurities.

The C content of the sprayed coating is lower than the C content of the steel wire rod. Accordingly, in order to secure strength of the sprayed coating, the C content of the steel wire rod is set considering a decreased amount of C due to the arc-spraying. In this case, since the strength of the sprayed coating is secured, the sprayed coating is not easily damaged. As a result, the service life of the sprayed coating is extended.

The Si content of the steel wire rod is set from the viewpoint of securing lubricity of the sprayed coating. In this case, since lubricity of the sprayed coating is secured, piercing efficiency is increased. That is, the piercing plug is easily pressed into the billet during the piercing, and thus, the billet does not easily slip with respect to the inclined rolls. Accordingly, piercing time is shortened, and contact time between the piercing plug and the billet is shortened. As a result, the sprayed coating is not easily damaged, and thus, the service life of the sprayed coating is extended.

Moreover, since the sprayed coating is formed by arc-spraying the steel wire rod, manufacturing cost of the sprayed coating can be suppressed. Hereinafter, the piercing plug according to the present embodiment will be described in detail.

Figure 2:
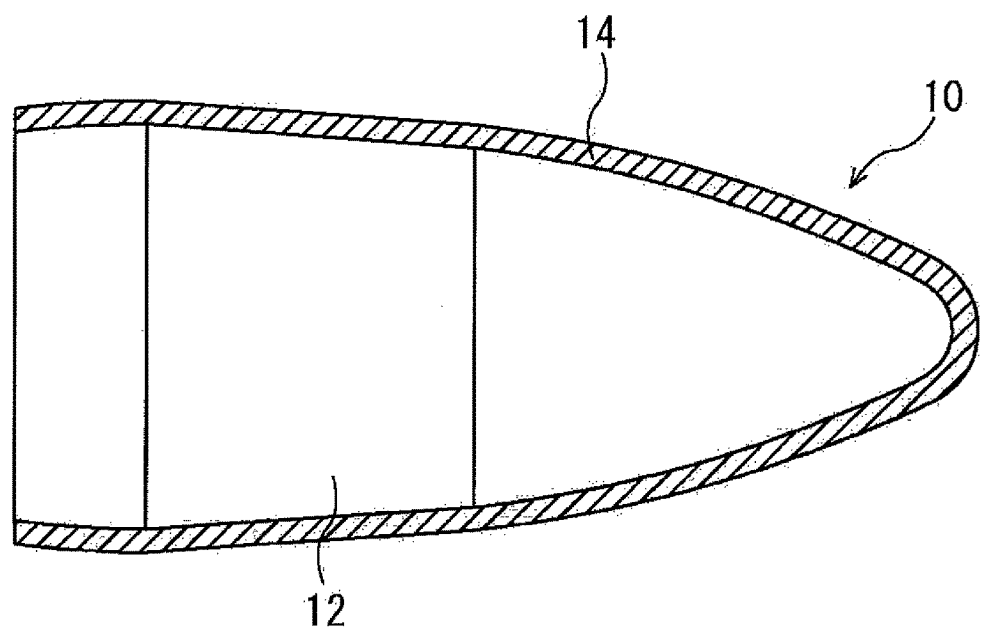
FIG. 2 is a longitudinal cross-sectional view of a piercing plug according to an embodiment of the present invention.

FIG. 2 is a cross-sectional view of a piercing plug 10 according to the present embodiment. As shown in FIG. 2, the piercing plug 10 includes a plug main body 12 and a sprayed coating 14.

The plug main body 12 is configured of a well-known chemical composition and includes a well-known shape.

The sprayed coating 14 is formed on the surface of the plug main body 12. The sprayed coating 14 includes iron and iron oxide (for example, $Fe_3O_4$, FeO, or the like). The sprayed coating 14 includes, by mass %, C: 0.015% to 0.6%, Si: 0.05% to 0.5%, Mn: 0.1% to 1.0%, and Cu: 0 to 0.3%, in addition to the iron and the iron oxide. The remainder of the sprayed coating 14 is impurities. The sprayed coating 14 is formed by arc-spraying the steel wire rod on the surface of the plug main body 12.

The steel wire rod includes, by mass %, C of 0.05% to 1.1%, Si of 0.4% to 1.3%, Mn of 0.2% to 2.0%, and Cu of 0% to 0.5% and the remainder including Fe and impurities. Hereinafter, each element will be described.

C increases the strength of the sprayed coating 14. If the C content is too low, the effect of increasing the strength cannot be effectively obtained. If the strength of the sprayed coating 14 is low, the sprayed coating 14 is easily deformed during the piercing-rolling, and wrinkles are easily formed on the sprayed coating 14. On the other hand, if the C content is too high, toughness of the sprayed coating 14 is decreased. Therefore, cracks easily occur on the sprayed coating 14. Accordingly, the C content is 0.05% to 1.1%. A lower limit of the C content is preferably 0.2%, and more preferably 0.6%. An upper limit of the C content is preferably 1.0%, and more preferably 0.9%.

The C content of the sprayed coating 14 is lower than the C content of the steel wire rod. For example, when the C content of the steel wire rod is 0.05%, the C content of the sprayed coating 14 is approximately 0.02%.

Si increases the lubricity of the sprayed coating 14. If the Si content is too low, the effect of increasing the lubricity cannot be effectively obtained. Therefore, the piercing efficiency is decreased, and the service life of the sprayed coating 14 is decreased. On the other hand, if the Si content is too high, the toughness of the sprayed coating 14 is decreased. Therefore, cracks easily occur on the sprayed coating 14. Moreover, if the Si content is too high, the sprayed coating 14 is easily melted at the time of the piercing-rolling. Therefore, the sprayed coating 14 is easily worn out. Accordingly, the Si content is 0.4% to 1.3%.

Mn increases the strength of the sprayed coating 14. If the Mn content is too low, the effect of increasing the strength cannot be effectively obtained. Therefore, the sprayed coating 14 is easily deformed, and wrinkles are easily formed on the sprayed coating 14. On the other hand, if the Mn content is too high, the toughness of the sprayed coating 14 is decreased. Therefore, cracks easily occur on the sprayed coating 14. Accordingly, the Mn content is 0.2% to 2.0%. An upper limit of the Mn content is preferably 1.5%.

The remainder of the steel wire rod is Fe and impurities. The impurities are elements which are ore or scarp used for a raw material of the steel wire rod, or elements which are mixed from environment or the like of a manufacturing process. For example, the impurities are P, S, oxygen (O), or the like. The P content included in the steel wire rod is preferably 0.030% or less, and more preferably 0.01% or less. The S content is preferably 0.0030% or less, and more preferably 0.001% or less.

In the steel wire rod described above, instead of a portion of Fe, Cu of 0.5% or less may be further included. That is, Cu is a selective element.

Cu favorably maintains conductivity of the steel wire rod when the arc-spraying is performed. If the Cu content exceeds 0.5%, the toughness of the sprayed coating 14 is damaged. Accordingly, the Cu content is 0.5% or less. A lower limit of the Cu content is preferably 0.05%. If the Cu content is 0.05% or more, when the arc-spraying is performed, the steel wire rod can be stably supplied.

Moreover, in the steel wire rod, instead of a portion of Fe, elements other than Cu described above may be included. For example, as other elements, there are Al, W, Ni, Mo, Nb, and the like. However, it is preferable that the steel wire rod includes Fe as a main component and includes at least C, Si, and Mn having the content described above.

Figure 3:
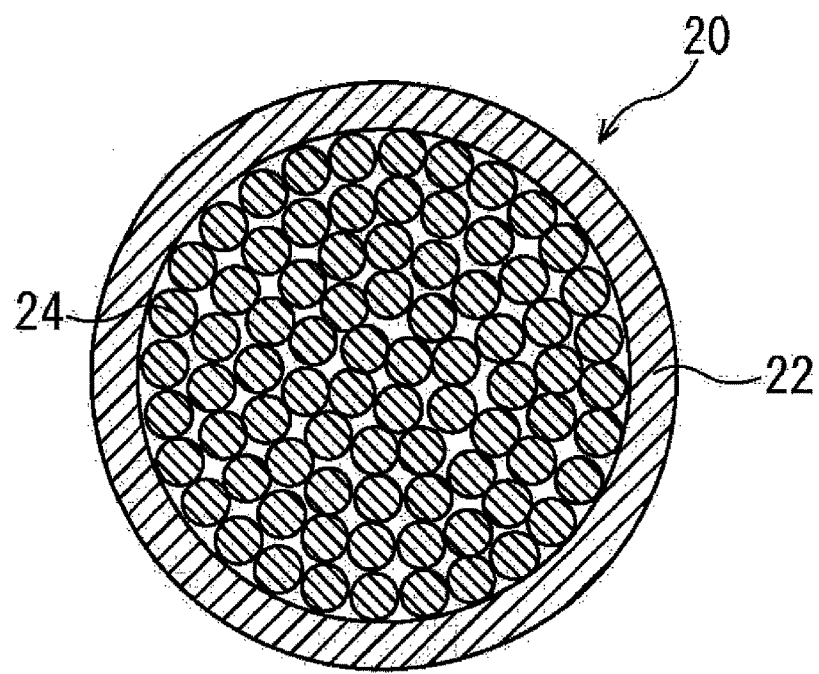
FIG. 3 is a cross-sectional view showing an example of a steel wire rod which is used for formation of a sprayed coating.

The steel wire rod may be solid or may be a steel wire rod shown in FIG. 3. The steel wire rod 20 shown in FIG. 3 includes an outer shell 22 and a plurality of fillers 24.

The outer shell 22 has a pipe shape and includes Fe. The fillers 24 are filled in the outer shell 22. For example, the fillers 24 are Fe—Mn particles, Si powder, and Fe—C powder. A filling amount of the fillers 24 is set considering the content of C, Si, and Mn in the outer shell 22. A chemical composition of the steel wire rod 20 is analyzed in a state where the steel wire rod 20 is melted. As a result of the analysis, if the content of C, Si, and Mn is within the ranges described above, the steel wire rod is included in the present invention. Moreover, for example, the filler 24 may be granular, pulverized, or fibrous.

For example, a thickness of the sprayed coating 14 is 400 μm to 1200 μm. The thickness of the sprayed coating 14 is not necessarily constant. For example, a tip portion of the sprayed coating 14 may be thicker than other portions.

Before the sprayed coating 14 is formed, shot blasting may be performed on a surface of the plug main body 12 on which the sprayed coating 14 is formed. Accordingly, the surface of the plug main body 12 is roughed, and adhesion of the sprayed coating 14 is improved.

A ratio occupied by the iron oxide in the sprayed coating 14 is preferably 55 volume % to 80 volume %. For example, in the ratio occupied by the iron oxide in the sprayed coating 14, the ratio of the surface side of the sprayed coating 14 is higher than that of the plug main body 12 side. For example, in this case, the ratio occupied by the iron oxide in the sprayed coating 14 is 40 volume % or less at the boundary portion between the sprayed coating 14 and the plug main body 12 and is 55 volume % to 80 volume % at the surface portion of the sprayed coating 14. For example, in order to change the ratio occupied by the iron oxide in the sprayed coating 14, a distance (a spray distance) from a spray nozzle of the arc-spraying device to the plug main body 12 may be changed.

EXAMPLE

A plurality of piercing plugs were prepared in which the chemical compositions of the steel wire rods used to form the sprayed coating were different from one another, and a piercing frequency of each piercing plug, damage conditions of the sprayed coating, and piercing efficiency were examined.

[Test Method]

Steel wire rods having chemical compositions shown in Table 1 were prepared.

TABLE 1

|  | Chemical Composition of Steel Wire Rod (Unit is mass % and the Balance is Fe and Impurities) | | | | | | Piercing Frequency (times) | Piercing Efficiency (%) |
| --- | --- | --- | --- | --- | --- | --- | --- | --- |
|  | C | Si | Mn | Cu | P | S | | |
| Example 1 | 0.05 | 1.0 | 1.0 | 0.2 | 0.030 | 0.0030 | 7 | 82 |
| Example 2 | 1.0 | 1.0 | 1.0 | — | 0.030 | 0.0030 | 10 | 84 |
| Example 3 | 0.7 | 0.4 | 1.0 | — | 0.030 | 0.0030 | 10 | 81 |
| Example 4 | 0.7 | 1.0 | 1.0 | 0.2 | 0.030 | 0.0030 | 9 | 80 |
| Example 5 | 0.7 | 1.3 | 1.0 | — | 0.030 | 0.0030 | 9 | 83 |
| Example 6 | 0.6 | 1.0 | 1.5 | — | 0.030 | 0.0030 | 9 | 84 |
| Comparative Example 1 | 0.03 | 1.0 | 1.0 | 0.2 | 0.030 | 0.0030 | 2 | 74 |
| Comparative Example 2 | 1.2 | 1.0 | 1.0 | 0.2 | 0.030 | 0.0030 | 3 | 72 |
| Comparative Example 3 | 0.4 | 0.12 | 1.0 | — | 0.030 | 0.0030 | 2 | 52 |
| Comparative Example 4 | 0.7 | 0.3 | 1.0 | — | 0.030 | 0.0030 | 3 | 50 |
| Comparative Example 5 | 0.7 | 1.4 | 1.0 | — | 0.030 | 0.0030 | 1 | 73 |
| Comparative Example 6 | 0.5 | 1.0 | 0.05 | — | 0.030 | 0.0030 | 2 | 76 |
| Comparative Example 7 | 0.5 | 1.0 | 2.1 | — | 0.030 | 0.0030 | 1 | 72 |

The chemical compositions of the steel wire rods of Examples 1 to 6 were within the range of the present invention. In the steel wire rods of Comparative Examples 1 to 7, any one element of the chemical composition was out of the range of the present invention.

The sprayed coatings were formed on the surfaces of the plug main bodies by arc-spraying each steel wire rod at the same manufacturing condition, and thus, the piercing plugs were manufactured. All content percentages (volume %) of the iron oxide in the sprayed coating in each piercing plug were 20% at the boundary portion between the sprayed coating and the plug main body, and were 70% at the surface portion of the sprayed coating. In all thicknesses of the sprayed coatings, the tips were 1200 μm and portions other than the tips were 400 μm.

In Table 2, chemical compositions of the sprayed coatings which were formed on the surfaces of the plug main bodies by the steel wire rods having the chemical compositions of Examples 1 to 6, and chemical compositions of the sprayed coatings which were formed on the surfaces of the plug main bodies by the steel wire rods having the chemical compositions of Comparative Examples 1 to 7 were shown. As shown in Table 2, the chemical compositions of the sprayed coatings which were formed on the surfaces of the plug main bodies by the steel wire rods having the chemical compositions of Examples 1 to 6 were within the range of the present invention.

TABLE 2

| | Chemical Composition of Sprayed Coating (mass %) | | | | | | Piercing Frequency (times) | Piercing Efficiency (%) |
|---|---|---|---|---|---|---|---|---|
| | C | Si | Mn | Cu | P | S | | |
| Example 1 | 0.015 | 0.22 | 0.51 | 0.18 | 0.01 | 0.005 | 7 | 82 |
| Example 2 | 0.6 | 0.23 | 0.56 | — | 0.01 | 0.006 | 10 | 84 |
| Example 3 | 0.27 | 0.05 | 0.53 | — | 0.008 | 0.005 | 10 | 81 |
| Example 4 | 0.26 | 0.24 | 0.48 | 0.17 | 0.009 | 0.005 | 9 | 80 |
| Example 5 | 0.26 | 0.25 | 0.46 | — | 0.11 | 0.006 | 9 | 83 |
| Example 6 | 0.2 | 0.5 | 0.53 | — | 0.12 | 0.006 | 9 | 84 |
| Comparative Example 1 | 0.01 | 0.21 | 0.52 | 0.18 | 0.11 | 0.006 | 2 | 74 |
| Comparative Example 2 | 0.67 | 0.22 | 0.48 | 0.19 | 0.1 | 0.005 | 3 | 72 |
| Comparative Example 3 | 0.15 | 0.04 | 0.43 | — | 0.1 | 0.006 | 2 | 52 |
| Comparative Example 4 | 0.26 | 0.11 | 0.5 | — | 0.11 | 0.005 | 3 | 50 |
| Comparative Example 5 | 0.26 | 0.6 | 0.45 | — | 0.12 | 0.005 | 1 | 73 |
| Comparative Example 6 | 0.15 | 0.21 | 0.02 | — | 0.09 | 0.006 | 2 | 76 |
| Comparative Example 7 | 0.14 | 0.22 | 1.05 | — | 0.09 | 0.005 | 1 | 72 |

The piercing-rolling was performed on billet using the piercing plugs. The billet was 13Cr steel and had a diameter of 191 mm and a length of 2200 mm. After the piercing-rolling was performed on the billet, damage conditions of the sprayed coatings of the piercing plugs were confirmed visually. Moreover, lengths in the axial directions of the piercing plugs after the piercing-rolling were measured. When a deformation amount of the length in the axial direction of the piercing plug was 3 mm, when damage of the sprayed coating occurred, or when the piercing plug was eroded, the tests ended. However, even when damage of the sprayed coating occurred and the piercing plug was eroded, in a case where it was considered that internal flaw did not occur in a hollow tube stock which was obtained by performing the piercing-rolling, if a deformation amount of the length in the axial direction of the piecing plug was not 3 mm, the test was continued. Moreover, the reason why the test ended when the deformation amount of the length in the axial direction of the piercing plug was 3 mm is because the sprayed coating was worn away and thinned due to the piercing-rolling, thermal insulating effect of the sprayed coating was decreased and the plug main body was deformed.

After a nth rolling (n is natural number), when the deformation amount of the length in the axial direction of the piercing plug was 3 mm, in the cases where damage of the sprayed coating occurred and the piercing plug was eroded, the piercing frequency of the piercing plug was set as n−1 times. The strength of the sprayed coatings was evaluated based on the piercing frequency.

A definition of the piercing efficiency is as follows. A speed (hereinafter, referred to as a "transport speed") when the billet is transported in the axial direction is determined by the rotation number of the inclined rolls. However, an actual transport speed is influenced by frictional resistance between the piercing plug and the billet, or the like. Accordingly, the actual transport speed is lower than the theoretical transport speed which is calculated from the rotation number of the inclined rolls. This speed ratio ([(actual transport speed)/(theoretical transport speed)]×100(%)) is the piercing efficiency. The piercing efficiency was obtained for each piercing-rolling of the billet. Lubricity of the sprayed coating was evaluated based on an average value of the piercing efficiency.

[Test Results]

The test results are shown in both of Tables 1 and 2. The piercing frequencies of the piercing plugs including the sprayed coatings formed by arc-spraying the steel wire rods of Examples 1 to 6 were higher than the piercing frequencies of the piercing plugs including the sprayed coatings formed by arc-spraying the steel wire rods of Comparative Examples 1 to 7. Accordingly, the sprayed coatings which were formed by arc-spraying the steel wire rods of Examples 1 to 6 had higher strength than the sprayed coatings which were formed by arc-spraying the steel wire rods of Comparative Examples 1 to 7.

The piercing frequencies of the piercing plugs including the sprayed coatings formed by arc-spraying the steel wire rods of Examples 2 to 6 were higher than the piercing frequency of the piercing plug including the sprayed coating formed by arc-spraying the steel wire rod of Example 1. It was confirmed that the lower limit of the C content of the steel wire rod was preferably 0.6%.

In all the piercing plugs including the sprayed coatings formed by arc-spraying the steel wire rods of Examples 1 to 6, the deformation amounts of the lengths in the axial directions of the piercing plugs were 3 mm, and thus, the tests ended. When the tests ended, damages such as cracks or wrinkles were not present on the sprayed coatings which were included in each piercing plug.

Moreover, the piercing efficiency of the piercing plugs including the sprayed coatings formed by arc-spraying the steel wire rods of Examples 1 to 6 was higher than the piercing efficiency of the piercing plugs including the sprayed coatings formed by arc-spraying the steel wire rods of Comparative Examples 1 to 7.

In the steel wire rod of Comparative Example 1, the C content was lower than the lower limit of the range of the present invention. Accordingly, wrinkles occurred on the sprayed coating, and the piercing frequency was lowered. Since the strength of the sprayed coating was lowered, it was considered that plastic flow occurred on the sprayed coating at the time of the piercing-rolling and wrinkles were generated.

In the steel wire rod of Comparative Example 2, the C content was higher than the upper limit of the range of the present invention. Accordingly, cracks occurred on the sprayed coating, and the piercing frequency was lowered. Since the toughness of the sprayed coating was lowered, it was considered that cracks occurred.

In the steel wire rod of Comparative Example 3, the Si content was lower than the lower limit of the range of the present invention. Accordingly, the piercing efficiency was low. It was considered that the low piercing efficiency was generated due to the fact that the lubricity of the sprayed coating was decreased. Moreover, since the piercing efficiency was low, the erosion of the piercing plug occurred, and as a result, the piercing frequency was lowered.

In the steel wire rod of Comparative Example 4, the Si content was lower than the lower limit of the range of the present invention. Accordingly, the piercing efficiency was low. It was considered that the low piercing efficiency was generated due to the fact that the lubricity of the sprayed coating was decreased. Moreover, since the piercing efficiency was low, the erosion of the piercing plug occurred, and as a result, the piercing frequency was lowered.

In the steel wire rod of Comparative Example 5, the Si content was higher than the upper limit of the range of the present invention. Accordingly, cracks occurred on the sprayed coating, and the piercing frequency was lowered. Since the toughness of the sprayed coating was lowered, it was considered that cracks occurred.

In the steel wire rod of Comparative Example 6, the Mn content was lower than the lower limit of the range of the present invention. Accordingly, wrinkles occurred on the sprayed coating, and the piercing frequency was lowered. Since the strength of the sprayed coating was lowered, it was considered that plastic flow occurred on the sprayed coating at the time of the piercing-rolling and wrinkles were generated.

In the steel wire rod of Comparative Example 7, the Mn content was higher than the lower limit of the range of the present invention. Accordingly, cracks occurred on the sprayed coating, and the piercing frequency was lowered. Since the toughness of the sprayed coating was lowered, it was considered that cracks occurred.

As described above, the embodiment of the present invention is described in detail. However, the embodiment is merely example, and the present invention is not limited to the embodiment at all.

DESCRIPTION OF REFERENCE NUMERALS AND SIGNS

10: piercing plug
12: plug main body
14: sprayed coating

The invention claimed is:

1. A piercing plug comprising:
a plug main body which is tapered off toward a tip; and
a sprayed coating which is formed on a surface of the plug main body, the sprayed coating consisting of the following chemical composition:
by mass %,
C: 0.015% to 0.6%,
Si: 0.05% to 0.5%,
Mn: 0.1% to 1.0%, and
Cu: 0 to 0.3%.
and a balance composed of iron, iron oxide, and impurities, at least one impurity selected from the group consisting of P, S, or O.

2. The piercing plug according to claim 1,
wherein a content of C in the chemical composition of the sprayed coating is 0.2% to 0. 6%.

3. The piercing plug according to claim 1 or 2,
wherein a content of Cu in the chemical composition of the sprayed coating is 0.05% to 0. 3%.

4. A manufacturing method of a piercing plug including a plug main body which is tapered off toward a tip, and a sprayed coating which is formed on a surface of the plug main body, the manufacturing method comprising:
a process of forming the sprayed coating on the surface of the plug main body by arc-spraying a steel wire rod on the surface of the plug main body,
wherein a chemical composition of the steel wire rod includes, by mass %,
C: 0.06% to 1.1%,
Si: 0.4% to 1.3%,
Mn: 0.2% to 2.0%,
Cu: 0 to 0.5%, and
Fe.

5. The manufacturing method of a piercing plug according to claim 4,
wherein a content of Cu in the chemical composition of the steel wire rod is 0.05% to 0.5%.

\* \* \* \* \*